United States Patent [19]

Sherrill

[11] Patent Number: 5,106,037
[45] Date of Patent: Apr. 21, 1992

[54] UMBRELLA SEAL FOR AIRCRAFT

[75] Inventor: David E. Sherrill, Glendale, Calif.

[73] Assignee: Northrop Corporation, Hawthorne, Calif.

[21] Appl. No.: 475,060

[22] Filed: Feb. 5, 1990

[51] Int. Cl.⁵ .............................................. B64C 1/12
[52] U.S. Cl. ................................... 244/132; 244/121; 244/123
[58] Field of Search ................... 244/129.4, 123, 130, 244/131, 132, 121; 16/250, 277; 49/383

[56] References Cited

U.S. PATENT DOCUMENTS

| | | | |
|---|---|---|---|
| 2,441,087 | 5/1948 | Symer | 244/132 |
| 2,473,728 | 6/1949 | Rutledge | 244/131 X |
| 2,881,994 | 4/1959 | Michael | 244/132 X |
| 3,054,484 | 9/1962 | Griffiths et al. | 244/131 X |
| 3,075,234 | 1/1963 | Speakman | 16/250 |

Primary Examiner—Joseph F. Peters, Jr.
Assistant Examiner—Carla Mattix
Attorney, Agent, or Firm—Terry J. Anderson; Karl J. Hoch, Jr.

[57] ABSTRACT

An improved seal assembly positionable to cover a gap between aircraft panels. The seal assembly includes an umbrella seal and primary nodes extending therefrom into the gap. The seal assembly also includes secondary nodes in the gaps secured with respect to the panels and positioned between the primary nodes. The primary and secondary nodes having apertures aligned along a common axis. An elongated pin extends through the apertures of the primary and secondary nodes. The assembly further includes a cross seal positionable with its ends secured over ends of adjacent umbrella seals.

11 Claims, 5 Drawing Sheets

UMBRELLA SEAL FOR AIRCRAFT

BACKGROUND OF THE INVENTION

1. Field of the Invention

This invention relates to an umbrella seal for aircraft and, more particularly, to elongated members positioned over the slots formed between adjacent aircraft panels to cover such slots so that aircraft provided with such elongated members have superior laminar air flow thereover and so that radar detection is abated.

2. Description of the Background Art

In the field of aircraft, metallic plates are coupled or otherwise secured to a lower base structure as by Milson type fasteners, set screws or like mechanisms. The fasteners are removable to allow for access to internal aircraft components therebeneath and for the replacement and/or repair of the individual plates.

Proper engineering design of aircraft requires that adjacent plates be spaced a small distance from each other to allow for expansion and/or contraction of the plates during extreme thermal conditions. Such spacing also allows for plate shifting during the maneuvering of the aircraft when in operation and use. Unfortunately, however, the spacing between plates creates a discontinuous surface which interrupts the laminar flow of air thereover thus resulting in undesirable sound, drag, poor fuel consumption and diminished handling capabilities. In addition, the plates are normally electrically conductive thereby creating electrical discontinuities at the gaps which are detectable by radar. This is because the discontinuous elecrical surfaces, as created by the spacing between plates, increases electrical interference when reflecting radar waves. This increases the detectability of the aircraft by radar.

Various devices and techniques for covering gaps are either employed commercially or are disclosed in the patent literature. For example, with reference to U.S. Patent Numbers and their inventors, Michael U.S. Pat. No. 2,881,994 and Speakman U.S. Pat. No. 3,075,234 disclose methods of securing the wing skin to the wing structure of an aircraft. FIGS. 2 and 3 show how this skin is secured to the frame structure with rivets and continuous type hinges 5. This method is said to be aerodynamically superior to one where the skins are secured to the wing structure resulting in a quilt-like surface. In addition, Isenberg U.S. Pat. Nos. 4,171,785 and 4,296,899 show the known method of using tape for the recesses found in the outer skin of the aircraft.

As evidenced by the great number of prior patents and commercial devices and techniques, efforts are continuously being made in an attempt to improve gap covering seals. Such efforts are being made to render such seals more efficient, reliable, inexpensive and convenient to manufacture, install and use. None of these previous efforts, however, provides the benefits attendant with the present invention. Additionally, the prior patents and commercial devices and techniques do not suggest the present inventive combination of component elements arranged and configured as disclosed and claimed herein.

The present invention achieves its intended purposes, objects, and advantages through a new, useful and unobvious combination of component elements, with the use of a minimum number of functioning parts, at a reasonable cost to manufacture, and by employing only readily available materials.

Therefore, it is an object of this invention to provide a seal assembly positionable to cover a gap between aircraft panels, the seal assembly including an umbrella seal and primary nodes extending therefrom into the gap, the seal assembly also including secondary nodes in the gaps secured with respect to the panels and positioned between the primary nodes, the primary and secondary nodes having apertures aligned along a common axis and an elongated pin extending through the apertures of the primary and secondary nodes, the assembly further including a cross seal positionable with its ends secured over ends of adjacent umbrella seals.

A further object of the invention is minimize galvanic corrosion between adjacent aircraft panels by the use of improved umbrella seals.

It is a further object of this invention to simplify the design and usage of aircraft gap seals.

It is a further object of the present invention to improve the laminar flow of air adjacent to aircraft.

It is a further object of this invention to abate undesirable sound and drag of an aircraft.

It is a further object of this invention to improve fuel consumption and handling capabilities of an aircraft.

Lastly, it is an object of the present invention to preclude detection of aircraft by radar through the covering of gaps between adjacent aircraft panels.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiments shown in the attached drawings. For the purpose of summarizing the invention, the invention may be incorporated into an improved seal assembly positionable to cover a gap between aircraft panels. The seal assembly includes an umbrella seal and primary nodes extending therefrom into the gap. The seal assembly also includes secondary nodes in the gaps secured with respect to the panels and positioned between the primary nodes. The primary and secondary nodes have apertures aligned along a common axis. An elongated pin extending through the apertures of the primary and secondary nodes. Also included is a cross seal positionable with its ends secured over ends of adjacent umbrella seals.

The cross seal is a C-shaped configuration, or an H-shaped configuration, or an I-shaped configuration. Each umbrella seal has an end formed as a thin extension for being recieved under a cross seal end.

The invention may also be incorporated into improved gap seals for use with an aircraft having an exterior surface formed with panels and with elongated gaps and cross gaps located between the panels. The improved gap seals are positionable over the elongated gaps between the panels. Each gap seal includes primary nodes extending therefrom into the gap. Each gap seal also includes secondary nodes in the elongated gaps secured with respect to the panels and positioned between the primary nodes. The primary and secondary nodes have aligned apertures. An elongated pin extends through the apertures of the primary and secondary nodes of each gap seal. Further included are cross seals secured over the cross gaps between adjacent gap seals.

Each pin secures its associated gap seal in tension over the panels with the edges of the seals in contact with its associated panels. The apparatus further includes spaces between the gap seals and panels and between the edges of the gap seals. The apparatus further includes removable fasteners coupling the cross seals with respect to the panels and gap seals. The gap seals and panels are fabricated of the same electrically conductive material or of correlated materials.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which.

Similar reference characters refer to similar parts throughout the several Figures.

DETAILED DESCRIPTION OF THE INVENTION

Figure 1:
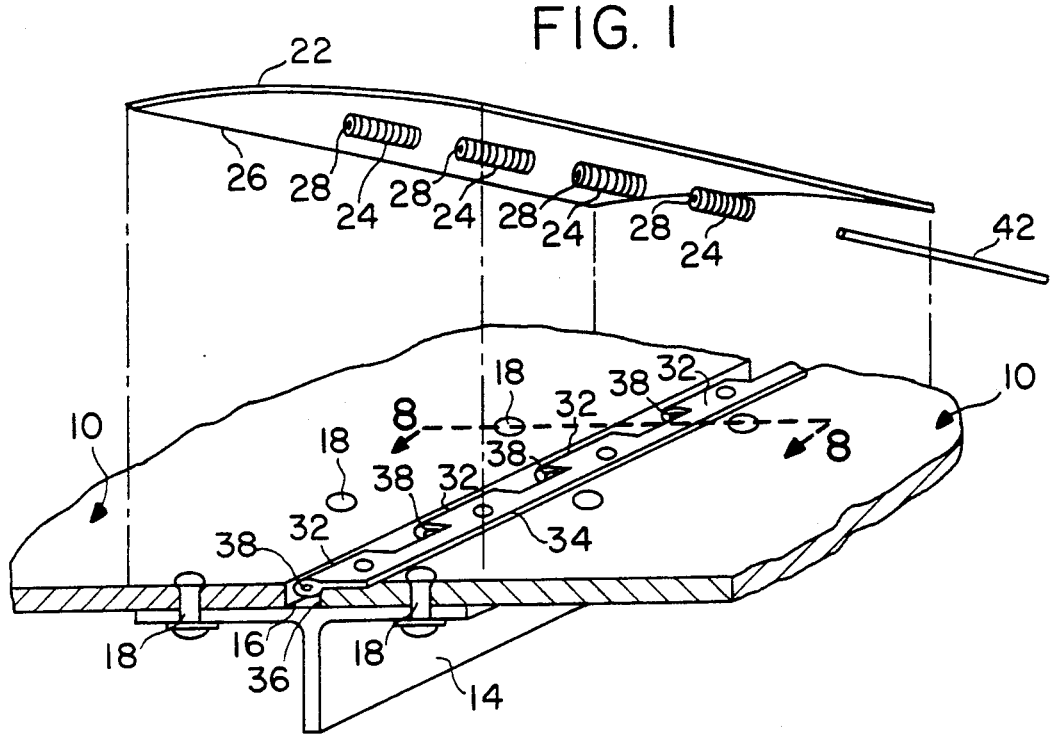
FIG. 1 is an exploded perspective illustration of adjacent aircraft skins secured to a substructure, with a linear space between the skins and with the umbrella seal of the present invention operatively positioned with respect thereto.

FIG. 1 illustrates adjacent plates 10 forming the external skin of a portion of an aircraft 12. The plates 10 are removably coupled to a substructure 14 with a gap 16 located between the plates 10. The plates 10 are fabricated of metallic or carbon composite materials with electrically conductive properties. They are coupled to the lower substructure 14 as by removable fasteners 18 of the Milson type, screws or like mechanisms. The substructure 14 may be I-beams, H-beams or the like The fasteners 18 are removable to allow for access to internal aircraft components therebeneath and for the replacement and/or repair of the individual plates. Adjacent plates are spaced a small distance from each other forming gaps to allow for expansion and/or contraction during extreme thermal conditions. Such spacing also accommodates plate shifting during the maneuvering of the aircraft.

The spacings or gaps between plates create a discontinuous surface which interrupts the laminar airflow thereover. This results in undesirable sound, drag, poor fuel consumption and diminished handling capabilities. All of these shortcomings are overcome by the use of the umbrella seal 22 of the present invention. In addition, the plates 10 are normally electrically conductive while the gaps are not thereby creating electrical discontinuities at the gaps. This renders the aircraft more detectable by radar. The discontinuous electrical surfaces, as created by the gaps between plates, increase electrical interference for more readily reflecting radar waves. This increases the detectability of the aircraft by radar. The use of the umbrella seal 22 of the present invention abates the electrical discontinuities to thereby reduce detectability by radar.

The various embodiments of the present invention is shown in the Figures. In accordance with the present invention, an umbrella seal 22 is utilized to abate discontinuities in airflow and electrical interference. Each seal 22 is centrally placed over an elongated gap 16 along the length of the gap. The seal 22 is fabricated of a metallic material, preferably titanium. It is of a length substantially equal to the length of the gap and of a width to cover the gap and the adjacent fasteners 18 coupling the plates 10 to the substructure 14, the coupling being effected by conventional techniques.

Upper nodes 24 are centrally located with respect to the side edges 26 on the underside of the seal, parallel therewith and extending along the length thereof. Such upper nodes 24 are the primary nodes and are bonded to the umbrella seal by any suitable technique or, in the alternative, are machined on integrally formed extensions thereof. The primary nodes 24 project downwardly into the gap 16 and are equally spaced therealong. Circular apertures 28 extend through the primary nodes 24 along a common access.

Complementary lower nodes 32 extend into the gap and are secured with respect to one of the adjacent plates 10. Such complementary lower nodes 32 are the secondary nodes and are secured in proper position by a side plate 34 secured to an edge 36 of a plate 10 adjacent to the gap 16 by removable fasteners such as set screws penetrating into a panel. Each secondary node 32 has an aperture 38 and a side plate 34 supports a plurality of secondary nodes 32 in spaced locations. The upper nodes and the lower nodes are located parallel with the side edges 26 of the seals, centrally located therebetween. The upper and lower nodes 24 and 32 are axially aligned when coupled with slight spaces therebetween so that when coupled along their common axis a common pin 42 may be passed through the apertures of the aligned upper and lower nodes. Removal of the pin 42 allows for removal of the umbrella seal 22. The umbrella seal along with its associated nodes and coupling pin constitute a seal assembly. Short coupling seals are positioned between the ends of the umbrella seals.

Figure 8:
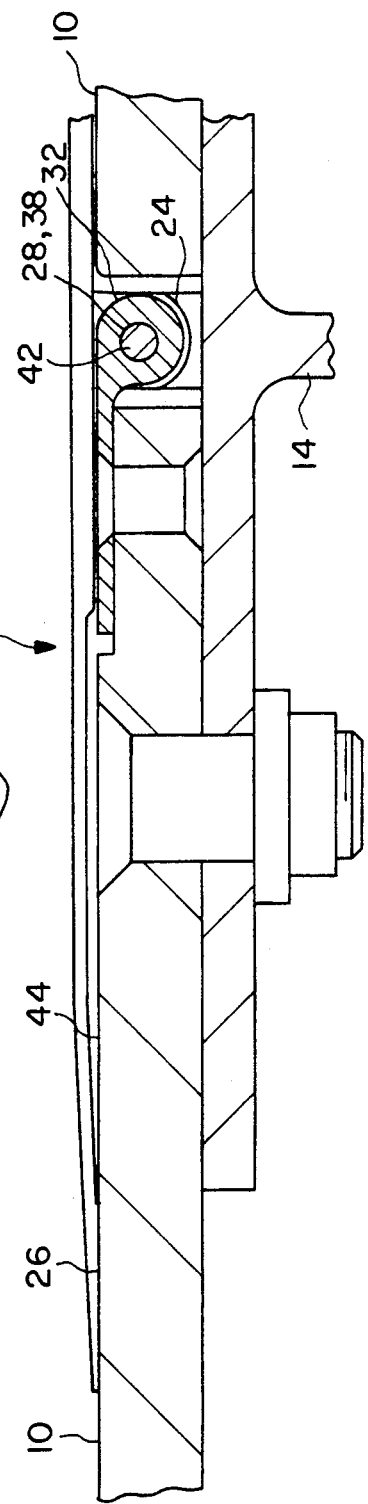
FIG. 8 is an enlarged sectional view taken through the umbrella seal, nodes, pin and panels of any of the above-described embodiments of the invention such as along line 8—8 in FIG. 1.

FIG. 8 is an enlarged sectional view taken through the umbrella seal 22, nodes 24 and 32, pin 42 and panels 10 of any of the herein-described embodiments of the invention such as along line 8—8 in FIG. 1. The left hand side edge 26 of the umbrella seal and its center are fully shown. The right hand side edge, not shown, is essentially symmetric with the left. The side edges 26 of the umbrella seal are shown in contact with the exterior face of the panels 10 along the entire length of the seals 22. The central portion of the umbrella seal above the nodes and laterally thereof is normally raised and out of contact with the panels forming an undercut region 44. A space is thus created therebetween. Prior to coupling the primary and secondary nodes with the pin, the primary nodes are, in fact, raised upwardly toward the umbrella seal away from the plates 10 and secondary nodes 32. The side edges extend downwardly toward the primary nodes a greater distance than shown in FIG. 8. As such, the longitudinal center of the umbrella seals must be pushed downwardly to align their primary node apertures 28 with the secondary node apertures 38 so that they may be coupled by the passing of the pin therethrough. All seals 22 are thus spring loaded at their side edges 26 or tips which precludes aerodynamic lift-off during flight. The spring tension is provided by the pin 42.

Figure 2:
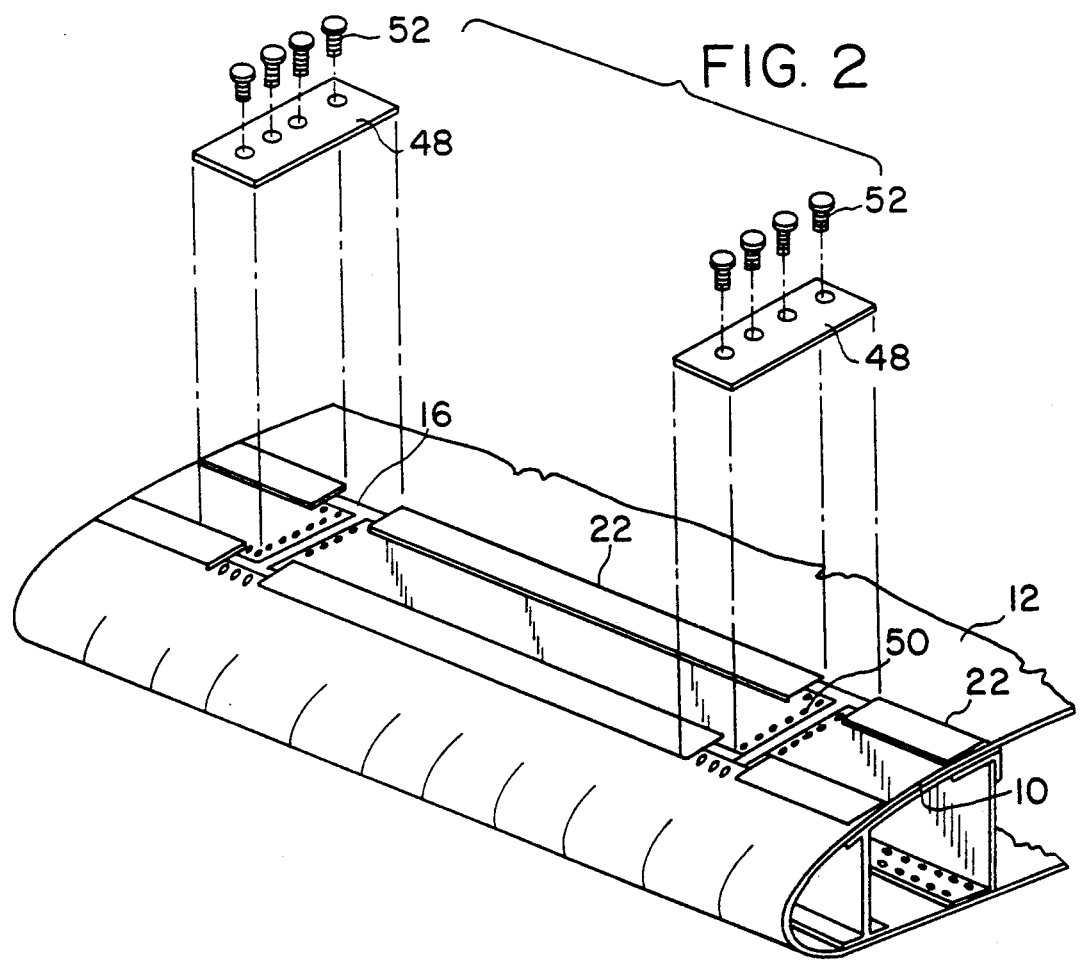
FIG. 2 is a perspective illustration of the leading edge of an aircraft wing illustrating a plurality of panels coupled with respect to each other forming a plurality of interrelated spaces and with a plurality of umbrella seals operatively positioned with respect thereto.

In the FIG. 2 embodiment, the umbrella seals 22 are essentially the same as those in FIG. 1. Short cross seals 48, however, are located to cover the cross gaps 50 between adjacent umbrella seals 22. Such cross seals 48 are held in position by fastening devices 52 penetrating into the substructure 14 (not shown). The fastening devices 52 also apply forces to hold the cross seals 48 in tension. Removal of the cross seals 48 in this and the following embodiments allows for the insertion and removal of an elongated pin 42 with respect to the apertures 28 and 38 of the primary and secondary nodes 24 and 32 for coupling and uncoupling of the umbrella seals 22 with respect to the panels 10. Replacement of the cross seals precludes the insertion and removal of the pins 42.

Figure 3:
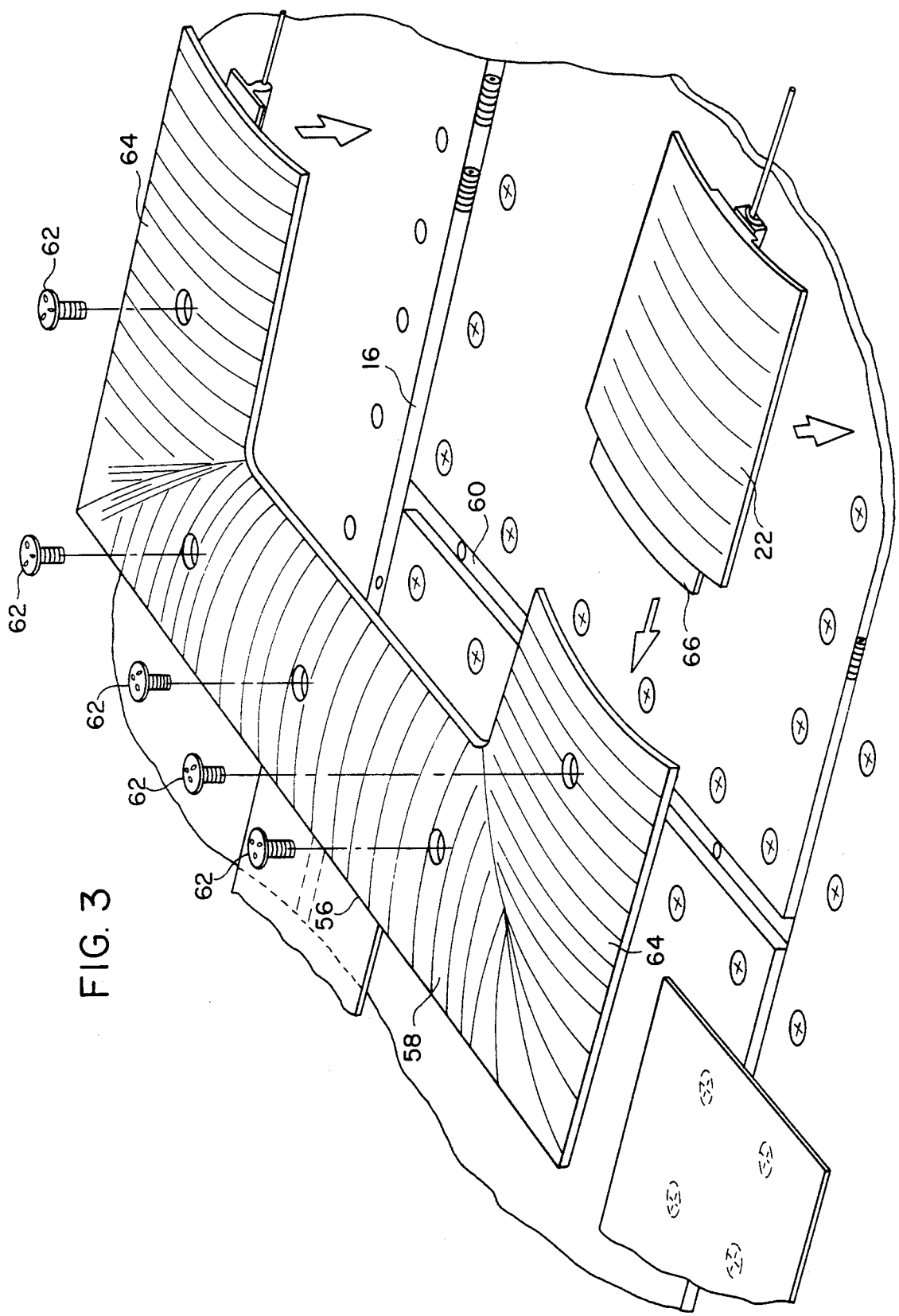
FIG. 3 is an enlarged perspective illustration similar to FIG. 2 showing elongated spacings being filled by umbrella seals and with a C-shaped coupling seals operatively associated therewith.

The FIG. 3 embodiment utilizes umbrella seals 22, pins 42 and nodes 24 and 32 as described above in the FIGS. 1 and 2 embodiments. The short cross seals 56 of the FIG. 3 embodiment are C-shaped in configuration. The central extent 58 of the C-shaped seal will cover the cross gap 60 with fasteners 62 extending through holes in the cross seals 56 for coupling the cross seals 56 to the substructure 14. The short upper and lower portions 64 cover a short extent of the elongated gaps 16 and are raised or bowed to cover thin extensions 66 from the adjacent ends of the elongated umbrella seals 22. This arrangement allows the ends of the cross seals 56 to hold down the ends of the umbrella seals 22. In the alternative, the upper and lower portions may be raised or bowed upwardly to a greater extent to overlap the ends of the umbrella seals 22 without the use of the thin extensions 66. The arrangement of umbrella seals 22 and cross seals 56 allows for the expansion and contraction of panels 10, umbrella seals 22 and cross seals 56.

Figure 4:
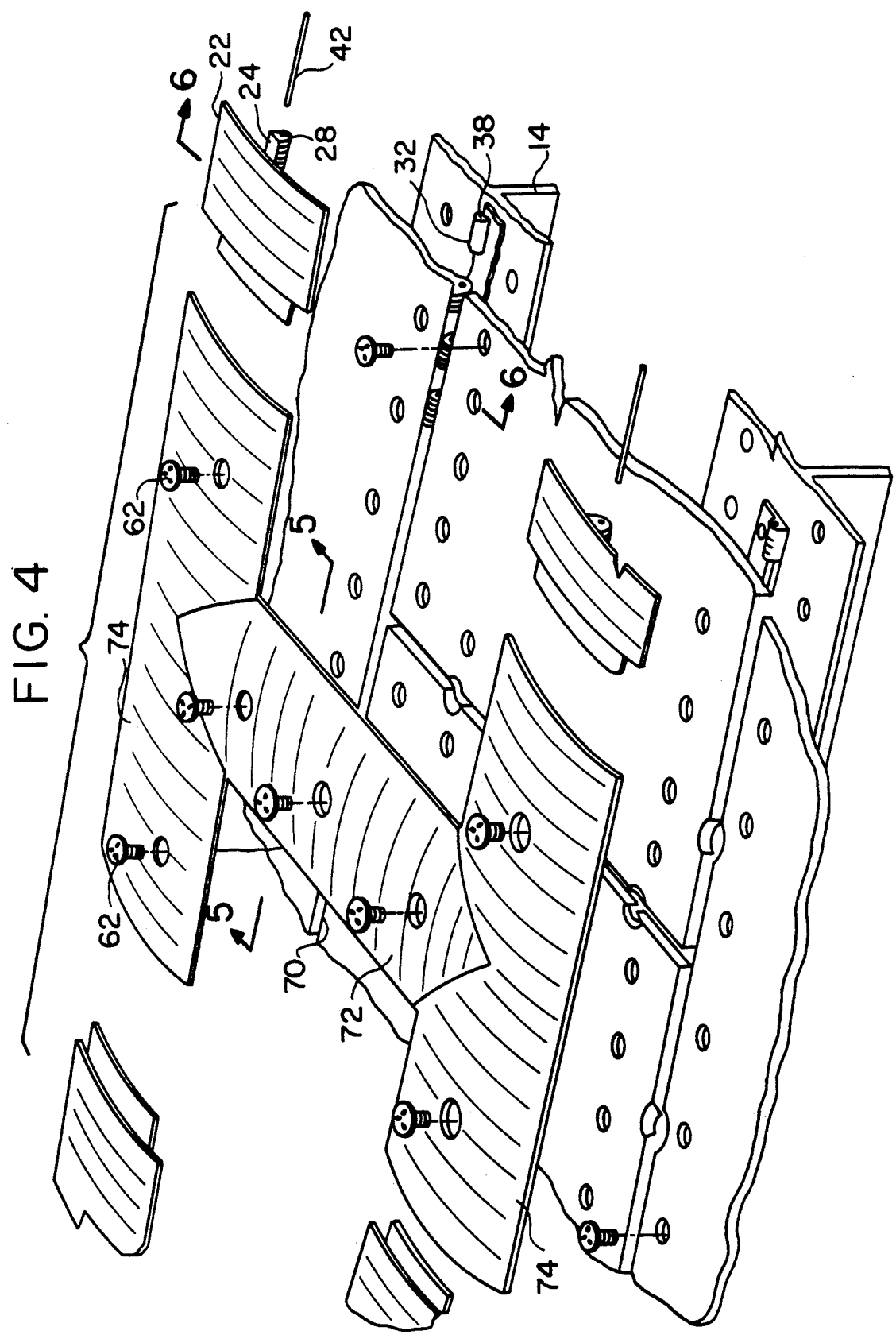
FIG. 4 is an enlarged perspective illustration similar to FIG. 3 but showing an H-shaped coupling seal.

The FIG. 4 embodiment is similar to the FIG. 3 embodiment with the same umbrella seal 22 and arrangement of pin 42 and nodes 24 and 32. The short cross-seals 70, however, are in an H-shaped configuration. The central extent 72 joins upper and lower cross pieces 74 which are raised slightly at their ends 76. They are thus adapted to receive thin extensions 66 from the adjacent ends of the elongated umbrella seals 22 for hold down purposes. Removable fasteners 62 along the longitudinal axes of the central and cross pieces 72 and 74 hold down the cross-seals, under tension in a spring loaded condition as in the prior embodiments.

Figure 5:
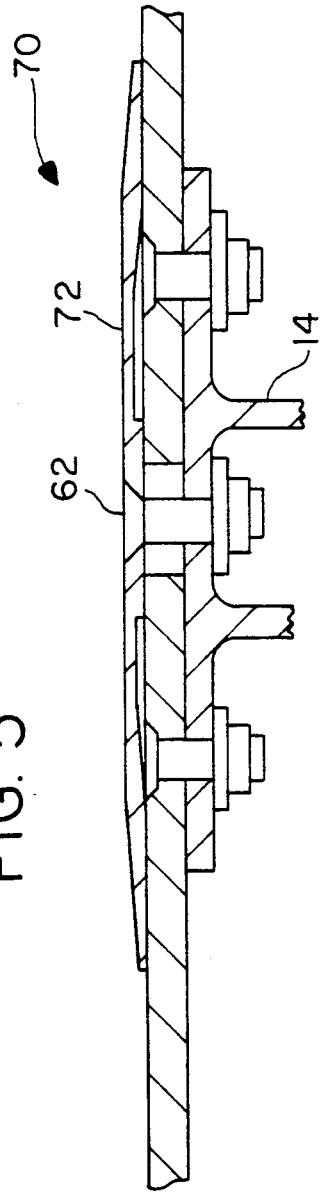
FIGS. 5 and 6 are sectional views taken along lines 5—5 and 6—6 of FIG. 4 respectively.
Figure 6:
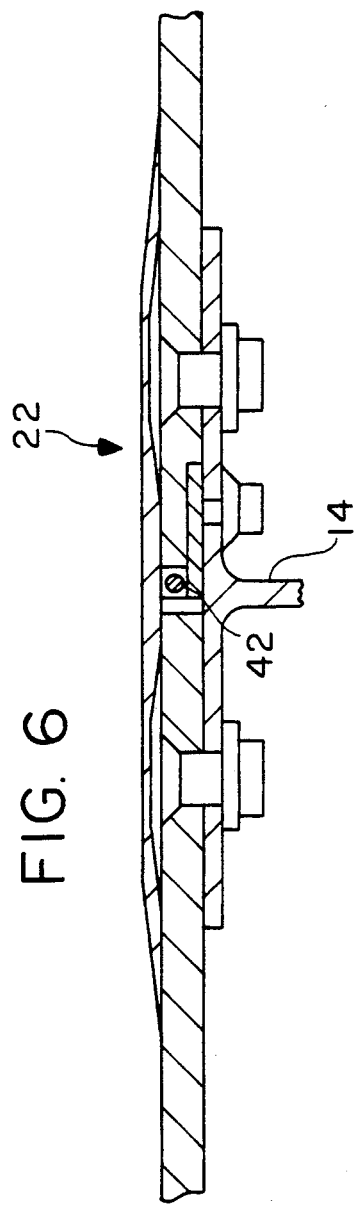

FIGS. 5 and 6 illustrate the cross-sectional configuration of a short cross-seal 70 and the elongated umbrella seal 22 including the nodes 24 and 32 and pin 42. These cross sectional views are taken along lines 5—5 and 6—6 respectively.

Figure 7:
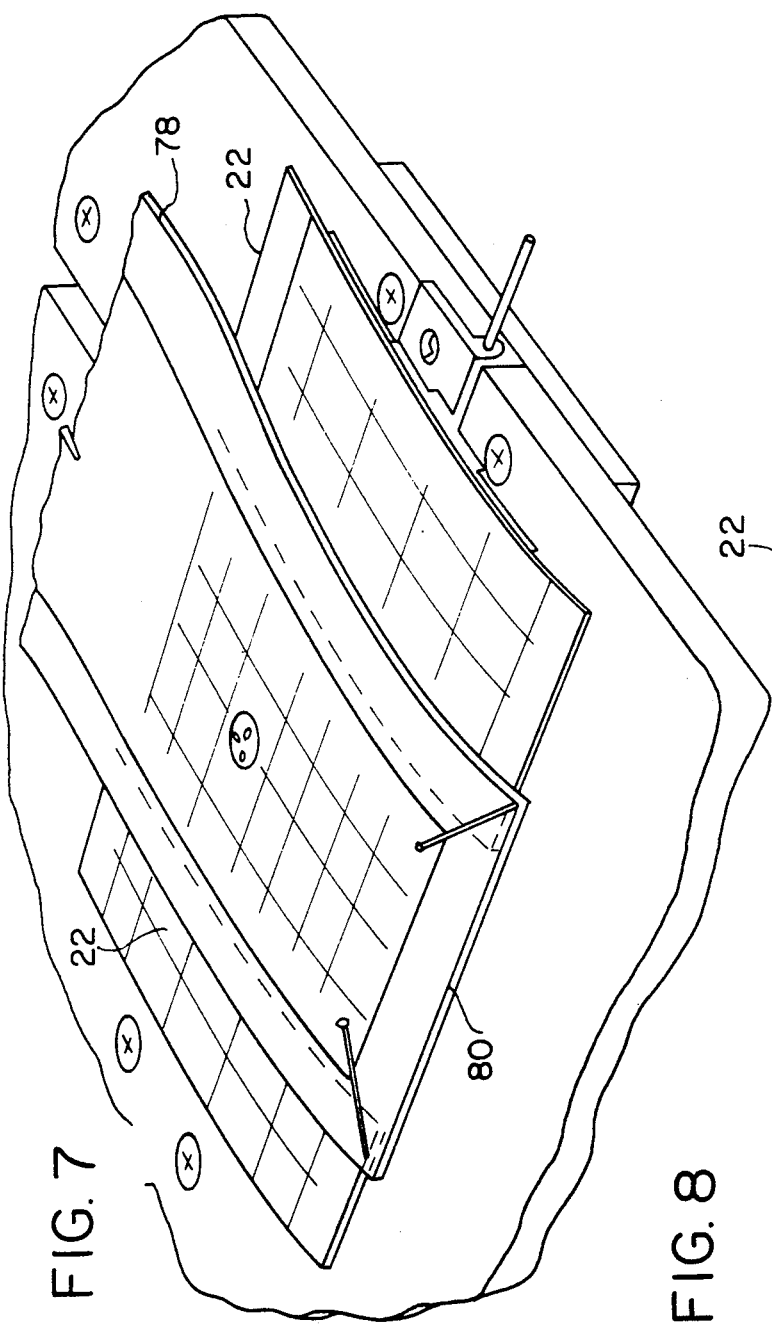
FIG. 7 is an enlarged perspective illustration similar to FIGS. 3 and 4 but showing an I-shaped covering seal.

The last embodiment is that shown in FIG. 7. This embodiment utilizes an I-shaped cross seal 78, one end 80 of which is illustrated in FIG. 7. The other end is similar in structure and function. In this embodiment, the ends of the elongated umbrella seals 22 adjacent to the cross-seal 78 are located directly beneath raised portions 82 in the ends of the I-shaped cross-seal 78. No thin extensions 66 are required at the ends of the umbrella seals 22 as in the embodiments of FIGS. 3 and 4. As in the prior embodiments, removable fasteners 62 along the longitudinal axes of the cross piece hold down the cross-seal 78 under tension in a spring loaded condition.

In all of the above referred to embodiments, the umbrella seals are fabricated of a material correlated with that of the aircraft panels with which they are to be utilized so as to abate galvanic corrosion. In the preferred embodiment, the umbrella seals are fabricated of titanium and the panels are fabricated of a carbon composite material. Without such correlated materials in contact with each other, galvanic corrosion would occur decreasing the effectiveness and life of the aircraft panels an well as the umbrella seals. The shape of the umbrella seals, which under tension, as in all of the above described embodiments, provides a smooth surface, devoid of gaps, which functions to reduce undesirable noise, drag, increase fuel consumption, and improve handling capabilities. The electrical conductivity of the umbrella seals couples the panels on opposite sides of the gaps thus abating electrical discontinuities at the gaps between panels rendering the aircraft less detectable by radar.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A seal assembly positionable to cover a gap between aircraft panels, the seal assembly including an umbrella seal of length and width to cover the gap and contact the exterior faces of associated aircraft panels and primary nodes extending therefrom into the gap, the seal assembly also including secondary nodes in the gaps secured with respect to the panels and positioned between the primary nodes, the primary and secondary nodes having apertures aligned along a common axis and an elongated pin removably extending through the apertures of the primary and secondary nodes.

2. The seal assembly as set forth in claim 1 and further including a removably positionable cross seal having ends removably secured over ends of adjacent umbrella seals.

3. The seal assembly as set forth in claim 2 wherein the cross seal is in a C-shaped configuration.

4. The seal assembly as set forth in claim 2 wherein the cross seal is in an H-shaped configuration.

5. The seal assembly as set forth in claim 2 wherein the cross seal is in an I-shaped configuration.

6. The seal assembly as set forth in claim 2 wherein each umbrella seal has a thin extension, the thin extension underlying an associated cross seal end.

7. For use with an aircraft having an exterior surface formed with panels and with elongated gaps and cross gaps located between the panels, improved gap seals positionable over the elongated gaps between the panels, each gap seal having a length and a width to cover an associated elongated gap, each gap seal also including primary nodes extending therefrom into the gap, each gap seal also including secondary nodes in the elongated gaps secured with respect to the panels and positioned between the primary nodes, the primary and secondary nodes having aligned apertures, an elongated pin removably extending through the apertures of the primary and secondary nodes of each gap seal, and further including cross seals secured over the cross gaps between adjacent gap seals, ends of the cross seals overlying ends of adjacent gap seals.

8. The apparatus as set forth in claim 7 wherein each pin secures its associated gap seal in tension over the panels, edges of the gap seals being in contact with surfaces of their associated underlying panels.

9. The apparatus as set forth in claim 8 and further including spaces between central portions of the gap seals and undercut regions of the panels lying thereunder, and between the edges of adjacent gap seals.

10. The apparatus as set forth in claim 9 and further including removable fasteners coupling the cross seals with respect to the panels and gap seals, the removable fasteners penetrating into a substructure member and removably securing the cross seals to the substructure.

11. The apparatus as set forth in claim 7 wherein the panels comprise an electrically conductive material and the gap seals comprise a correlated electrically conductive material.

* * * * *